Feb. 23, 1926.
J. BOCCHINO
1,574,597
MACHINE FOR FORMING CEMENT BLOCKS
Filed August 7, 1925     3 Sheets-Sheet 1
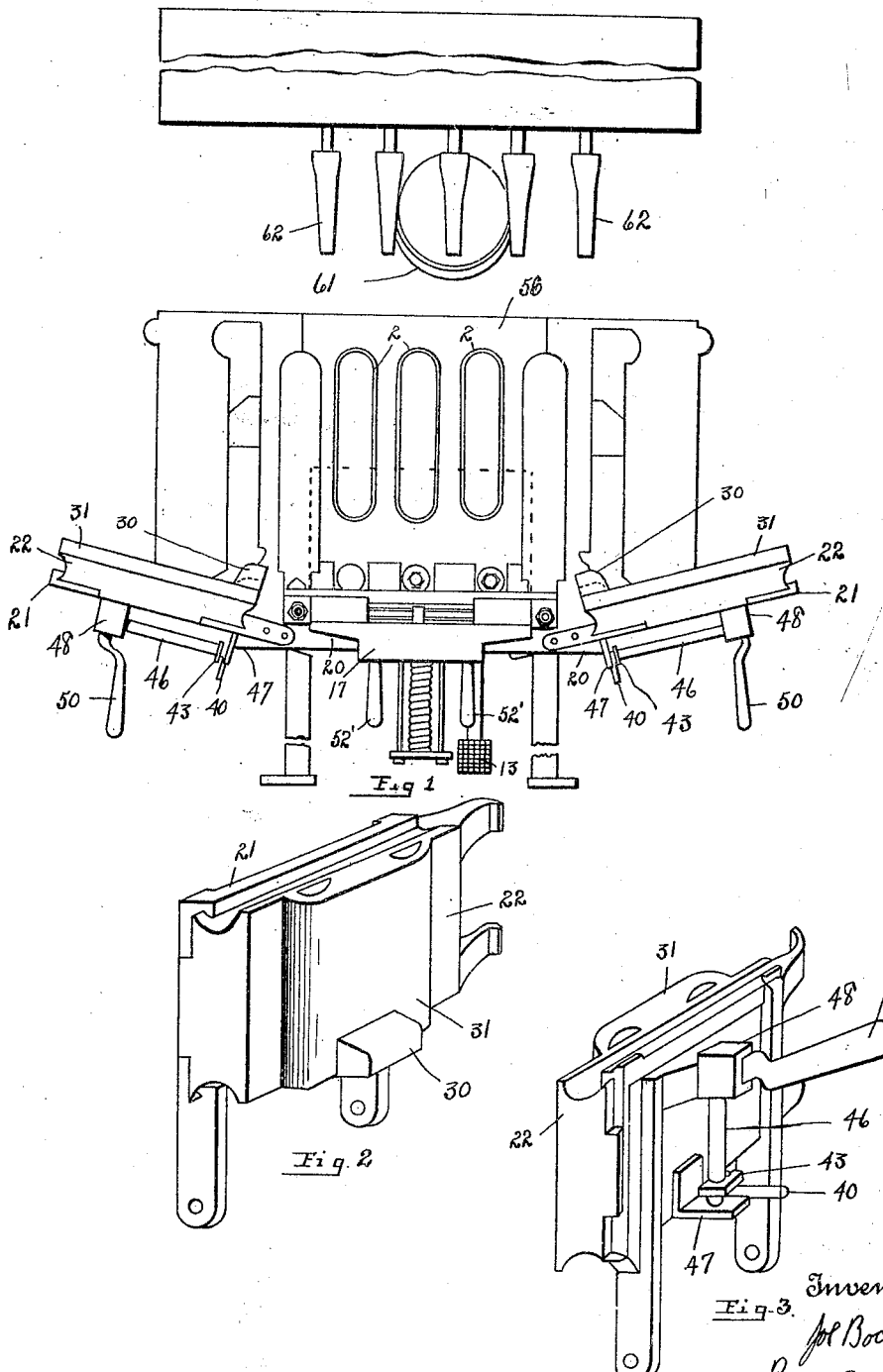

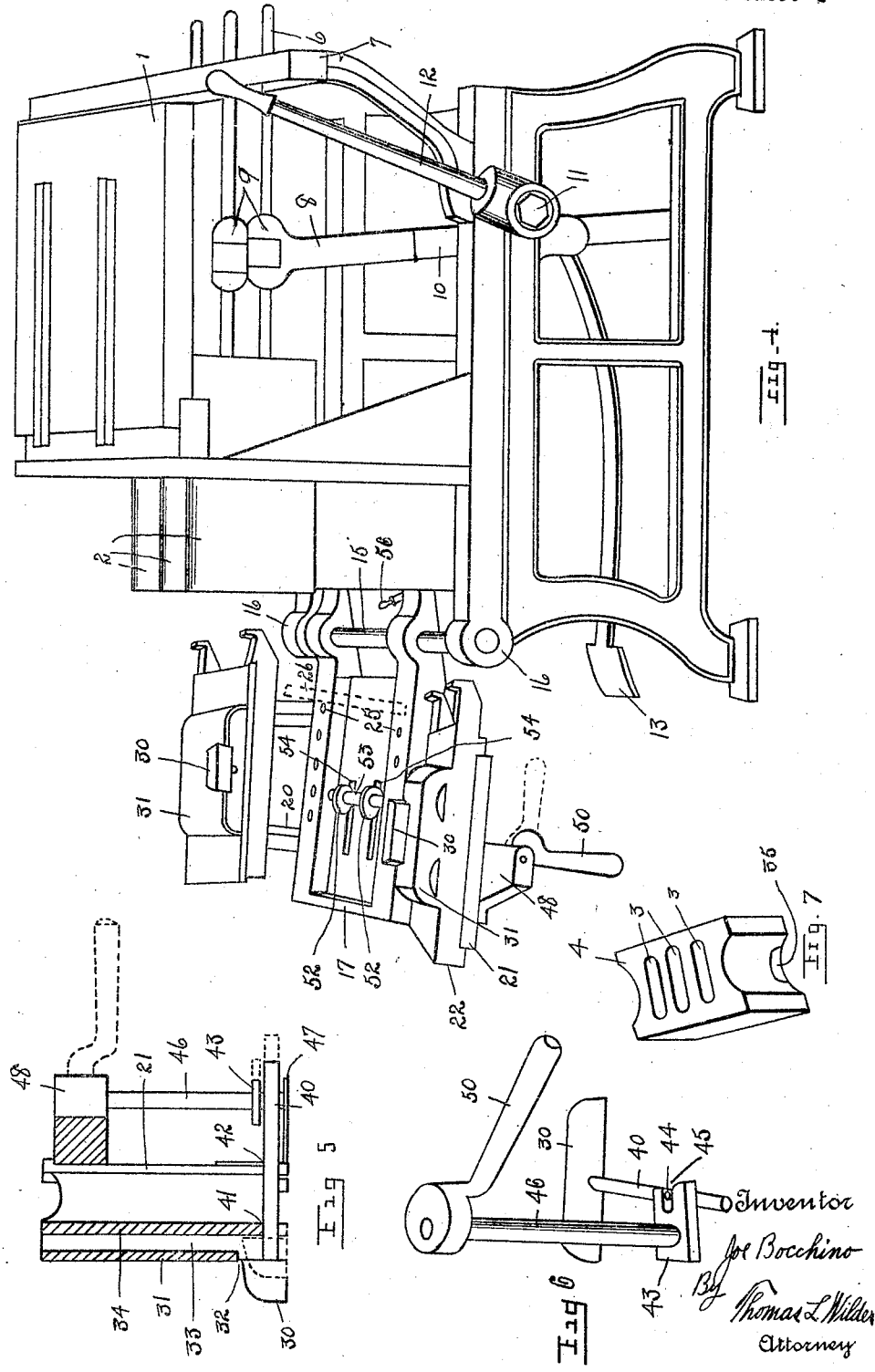

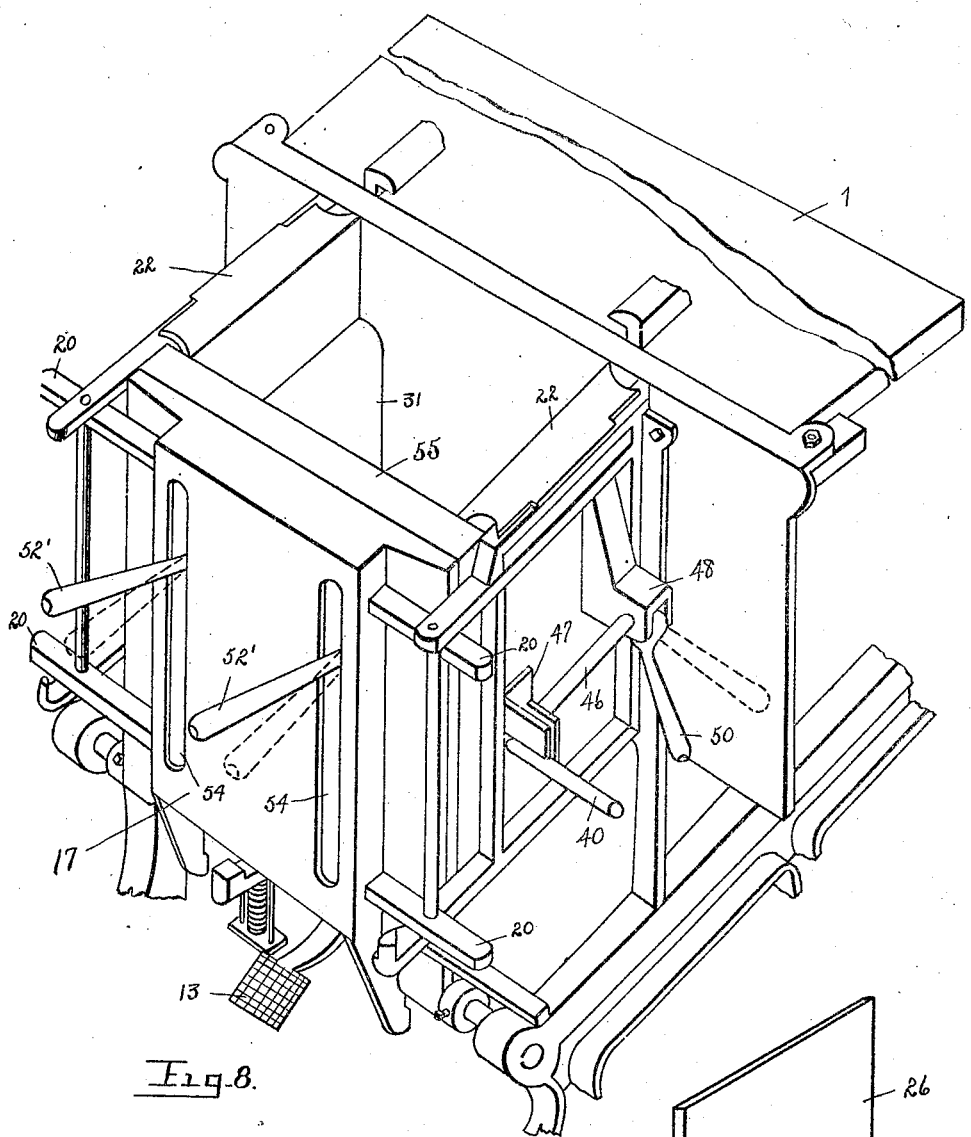

Patented Feb. 23, 1926.

1,574,597

UNITED STATES PATENT OFFICE.

JOE BOCCHINO, OF UTICA, NEW YORK.

MACHINE FOR FORMING CEMENT BLOCKS.

Application filed August 7, 1925. Serial No. 48,839½.

*To all whom it may concern:*

Be it known that I, JOE BOCCHINO, a citizen of United States, residing at 1004 South Street, in the city of Utica, in the county of Oneida and State of New York, have invented certain new and useful Improvements in Machines for Forming Cement Blocks, of which the following is a specification, reference being had therein to the accompanying drawing.

My invention relates to a machine for forming cement blocks and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a machine that will form cement blocks with recesses made therein for use as handles in manipulating the blocks.

Furthermore, the machine is equipped with a novel screw propeller for feeding the cement mixture to the mould and a novel manner of heating one side of the mould in order to aid in preventing the material from adhering thereto when removing the blocks.

The object will be understood by referring to the drawings, in which:

Fig. 1 is a front elevation of the machine showing parts broken away and a fragmentary view of a tamping machine disposed thereabove.

Fig. 2 is a detail enlarged view of one of the end plates employed showing a novel handle forming member attached thereto.

Fig. 3 is a rear view of Fig. 2 showing parts of the mechanism for actuating the handle forming member.

Fig. 4 is a perspective view looking at the side thereof of a cement block forming machine showing the handle forming parts attached thereto.

Fig. 5 is a detail enlarged view showing a section on the line 5, 5 of Fig. 2.

Fig. 6 is a detail enlarged view showing the handle forming member and the mechanism for actuating the same and segregated from the other parts of the machine.

Fig. 7 is a detail perspective view of a cement block showing the handle recesses formed therein.

Fig. 8 is an enlarged fragmentary view of the cement block forming machine showing the end members thereof to which the novel feature is attached.

Fig. 9 is a detail perspective view of a novel feeding device used.

Fig. 10 is a detail perspective view of a plate employed in the machine.

Referring more particularly to the drawings, the parts of the machine that are old and well known in the art, embodies a table 1 supporting the movable members 2, 2, 2 adapted to be projected into the mould, whereby to form open recesses 3 through the center portion of the cement block 4; rods 6, attached in each instance to movable members 2 and projecting through guide apertures in bar 7; arms 8 fixed at their upper ends 9 to move rods 6 and at their lower ends to rock yoke 10; shaft 11 and lever handle 12 adapted to rock arms 8; pedal 13 to aid also in rocking yoke 10; shaft 15 carried in bearings formed in the forward ends of frame bars 16, 16; rock frame 17 fulcrumed to turn upon shaft 15. Frame 17 has arms 20, 20 extending laterally from each side thereof adapted to support auxiliary frames 21, 21, which swing relative to frame 17. Auxiliary frames 21, 21 carry a removable end plate 22 in each instance. Frame 17 is equipped with apertures 25 adapted for mounting the removable base plate 26 of the mould, which plate is shown in dotted lines in Figs. 1 and 4 and in full lines in Fig. 10. Base plate 26 has mounted thereto pegs 27, 27 which fit in apertures 25 to hold said plate 26 in position.

The parts that are new embody the retreating handle forming members 30, 30 that are mounted to move relative to the inner surfaces of end plates 22, 22. For this purpose, the raised portion 31 of end plate 22 is recessed at 32 to allow member 30 to recede within the chamber 33 formed between the inner surface of raised portion 31 and the flat surface 34 of said end plate 22. Member 30 is made hollow and in the form of a handle, in order to make a similar shaped recess, for use as a handle, as at 35 in concrete block 4.

The mechanism for actuating members 30 includes, in each case, a longitudinally movable rod 40 attached to said member and projecting at right angles therefrom through an aperture at 41 made in plate 22 and another in alinement therewith made at 42 in auxiliary frame 21. Rod 40 is connected to rocking pawl 43 by a short shaft 44 fixed to rod 40 and projecting upward through an open slot 45 made in pawl 43. Pawl 43 is mounted to turn with shaft 46 disposed at right angles to rod 40. Shaft 46 has bearings at either end in bracket 47 and journal box 48, which are attached or formed integral with auxiliary frame 21. A handle 50 is rigidly fixed to the upper end of shaft 46, whereby to rotate said shaft and, thereby, rock pawl 43, which in turn will actuate rod 40 in a longitudinal manner to move handle forming member 30 relative to end plate 22.

Cams 52, 52 mounted to turn on shaft 53, which has bearings in frame 17, are also novel and adapted to force board 55 shown in full lines in Fig. 8 toward end plates 22, when the moulding frame is closed. Handles 52′, 52′ are formed integral with said cams 52 and project through recesses 54, 54 made in frame 17.

A gas jet 56 disposed beneath table 1 is intended to heat the lower surface of removable base plate 26, whereby to aid in freeing the cement mixture thereabove when removing the cement block from the mould.

Furthermore, a novel screw 60 is located in the feeding trough 61, whereby to push the cement mixture into the mould.

The operation of the machine is effected by disposing on frame 17 a board as 55, swinging end plates 22, 22 towards each other and then frame 17 and end plates 22 together towards the front 56 of the machine. Cams 52, 52 are forced upward by moving handles 52′, whereby to press board 55 towards end plates 22 in a tight manner. Handles 50, 50 are moved into full line position relative to end plates 22, 22, as illustrated in Fig. 8, whereby to project handle forming members 30, 30 towards each other and into the chamber of the mould, as shown in full lines in Figs. 2 and 5.

Lever handle 12 is rocked to force movable members 2 into the mould and screw 60 started to feed the cement mixture therein. Tampers 62 are set in motion to pound the cement mixture into shape, after which operation, the operator grasps handles 50, 50 and pulls upward thereon at the same time, swinging frame 17 and its connected auxiliary frames 21, 21 away from the front 56 of the machine. The upward pull on handles 50, 50 will withdraw handle forming members 30, 30 sufficiently from the moulded cement block 4 to permit said members 30 to clear the recesses formed in said block 4 when swinging auxiliary frames 21, 21 into full line position illustrated in Fig. 4.

Handles 50, 50 will be useful in swinging main frame 17 and auxiliary frames 21 from open to closed as well as from closed to open positions. Handles 50 will be stationary due to the direction of motion, when swinging auxiliary frames 21, 21 relative to the main frame 17.

Having thus described my invention what I claim as new and desire to secure by Letters Patent is:

1. In a machine for forming cement blocks, receding means for moulding a recess in said block, and rock means for actuating said receding means.

2. In a machine for forming cement blocks having swinging end members, means receding with respect thereto for forming handle recesses in the blocks, and rock means for actuating said receding means.

3. In a machine for forming cement blocks, a knockdown frame, means receding with respect thereto for forming a handle recess in a cement block, and rock means for actuating said receding means.

4. In a machine for forming cement blocks, a knockdown frame having swinging end members, movable means receding with respect to said members, whereby to form handle recesses in a cement block, and rock means for actuating said receding means.

5. In a machine for forming cement blocks, a collapsible frame having swinging end members, means adapted to move relative to said end members, whereby to form handle recesses in said cement block, and rock means for actuating said receding means.

6. In a machine for forming cement blocks, a frame, auxiliary frames pivoted to said first named frame, and receding means carried by said auxiliary frames, whereby to form handle recesses in a cement block.

7. In a machine for forming cement blocks, a rock frame, auxiliary frames pivoted to swing relative to said first named frame, and movable means carried by said auxiliary frames, whereby to form handle recesses in a cement block.

8. In a machine for forming cement blocks, end members, handle forming members mounted to move in said end members, and rock means for actuating said handle forming members.

9. In a machine for forming cement blocks, end members, handle forming members mounted in said end members, rods attached to said handle forming members, and rock means for actuating said rods, whereby to move the handle forming members in and out of given position.

10. In a machine for forming cement blocks, pivotally mounted end members, handle forming members mounted in said end members, rock means connected with said handle forming members, and handles for actuating said end members and said handle forming members.

11. In a machine for forming cement blocks, pivotally mounted end members, handle forming members mounted to move with respect to said end members, a rod mounted on said handle forming member, a short shaft mounted on said rod, a rocking pawl for engaging said shaft, a shaft connected with said rocking pawl, and a handle for actuating said parts, whereby to move the handle framing member and end plate in and out of given position.

12. In a machine for forming cement blocks, a pivotally mounted end plate, a handle forming member mounted in said end plate, rock members connected with said handle forming member, a rock handle for actuating said end plate and handle forming member, and means connecting said handle forming member with said rock handle.

In testimony whereof I have affixed my signature.

JOE BOCCHINO.